United States Patent
Kauffeldt

(10) Patent No.: US 7,534,186 B2
(45) Date of Patent: May 19, 2009

(54) REVERSING GEARSET OF A CONTINUOUSLY VARIABLE TRANSMISSION IN PARTICULAR A CONTINUOUSLY VARIABLE BELT TRANSMISSION

(75) Inventor: Rudolf Kauffeldt, Einzisweiler (DE)

(73) Assignee: ZF Transmission Technologies, L.L.C., Batavia, OH (US)

( * ) Notice: Subject to any disclaimer, the term of this patent is extended or adjusted under 35 U.S.C. 154(b) by 154 days.

(21) Appl. No.: 11/431,264

(22) Filed: May 10, 2006

(65) Prior Publication Data

US 2006/0258504 A1    Nov. 16, 2006

(30) Foreign Application Priority Data

May 11, 2005    (DE) ................. 10 2005 012 867

(51) Int. Cl.
*F16H 37/02*    (2006.01)

(52) U.S. Cl. ................... 475/210; 475/204; 475/207; 475/328

(58) Field of Classification Search ........... 475/323, 475/326, 327, 328, 204, 207, 210
See application file for complete search history.

(56) References Cited

U.S. PATENT DOCUMENTS

| | | | |
|---|---|---|---|
| 6,500,090 B2 * | 12/2002 | Kanda et al. ................. 477/45 |
| 6,832,974 B2 * | 12/2004 | Kakamu et al. ............. 475/331 |
| 6,855,085 B1 | 2/2005 | Gumpoltsberger |
| 2004/0014547 A1 * | 1/2004 | Habuchi et al. ............. 475/210 |
| 2004/0077444 A1 * | 4/2004 | Kanda et al. ................. 474/8 |

FOREIGN PATENT DOCUMENTS

DE    199 50 053    4/2001

* cited by examiner

*Primary Examiner*—David D. Le
(74) *Attorney, Agent, or Firm*—Davis & Bujold, P.L.L.C.

(57) ABSTRACT

A reversing gearset of a continuously variable transmission, in particular a continuously variable belt transmission has a drive input shaft (6), a primary shaft (10), a simple planetary gearset with a sun gear (2), a web (3) for the planetary gears (4) and an annular gear (5) and two shift elements (7, 8) for shifting to the forward or the reverse directions. The transmission ratio of the reversing gearset (1), in the reverse direction, is greater than one (i.e., it is a speed-drop ratio), such that in the forward direction, the transmission ratio of the reversing gearset (1) is equal to one.

7 Claims, 1 Drawing Sheet

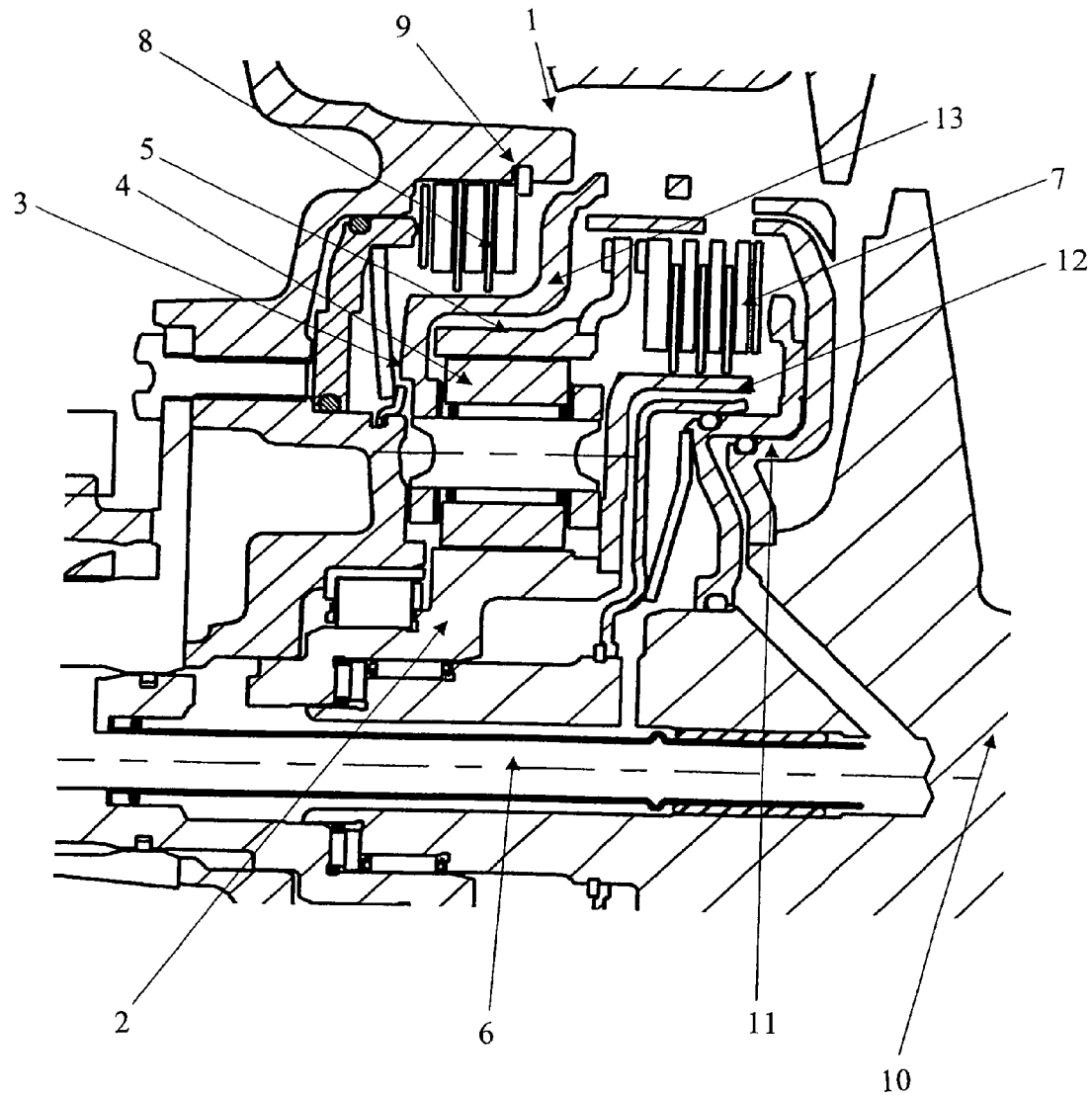

REVERSING GEARSET OF A CONTINUOUSLY VARIABLE TRANSMISSION IN PARTICULAR A CONTINUOUSLY VARIABLE BELT TRANSMISSION

This application claims priority from German Patent Application Serial No. 10 2005 021 867.9 filed may 11, 2005.

FIELD OF THE INVENTION

The present invention concerns a reversing gearset of a continuously variable transmission, in particular a continuously variable belt transmission, according to the preamble of claim 1. In addition the invention concerns a method for starting in reverse for a continuously variable belt transmission comprising the reversing gearset according to the invention.

BACKGROUND OF THE INVENTION

A continuously variable belt transmission usually consists among other things of a starting unit, a forward/reverse drive unit or a reversing gearset, an intermediate shaft, a differential, hydraulic and electronic control devices, and a variator.

According to the prior art, in such transmissions the variator comprizes a primary and a secondary gearset, also called the primary and secondary side, both gearsets being formed as conical disks and are arranged in pairs. In addition, a variator is provided with a torque-transmitting belt element which runs between the two conical disk pairs. In this the current transmission ratio is defined by the running radius of the belt element, which in turn is a function of the axial position of the conical disks.

From DE 199 50 053 there is known a continuously adjustable vehicle transmission with a variator for the continuously variable adjustment of transmission ratio and with a multistage gearbox having at least one input shaft and one output shaft and with at least two forward gears and at least one reverse gear.

In this, in the multi-stage gearbox a rotation direction reversal takes place between the input and output shafts by virtue of the at least two forward gears, whereas the reverse gear is designed with no rotation direction reversal between the input and output shafts.

The device for reversing the rotation direction can be a spur gear stage arranged downstream from a speed transmission. In particular, the multi-stage gearbox or reversing gearset is a planetary transmission connected via a spur gear stage to a downstream axle differential for driving the wheel axles of a motor vehicle.

Continuously variable transmissions are also known, whose gear change device, which is formed as a synchronization or claw clutch, has a dual action on two pairs of gearwheels to engage various transmission ratios, the gear change device being arranged between the gearsets. This design takes up considerable structural space in the axial direction between the gearsets in order to accommodate the gear change device together with actuation devices acting from outside.

In the case when the reversing gearset comprises a planetary gearset, it is known to construct this as a planetary gearset with double planetaries and a 1:1 transmission ratio; this gives the advantage that on starting, the same transmission ratio can be realized in both the forward and the reverse directions.

However, this design solution has the disadvantage of being elaborate to manufacture and assemble; furthermore, its production costs are high.

To avoid these disadvantages it has been proposed to construct the planetary gearset of the reversing gear as a simple planetary gearset, such that the drive input shaft is connected to the annular gear of the planetary gearset and the primary shaft to the sun gear of the planetary gearset. This, on the one hand, reduces the manufacturing complexity and costs; on the other hand, with this design the torque available in reverse gear is lower since there is a speed step-up. In certain situations this can have the disadvantageous result that not enough torque is available when starting in reverse. Besides, no compensation is possible by a corresponding adjustment of the variator.

SUMMARY OF THE INVENTION

The purpose of the present invention is to indicate a reversing gearset for a continuously variable transmission, in particular for a continuously variable belt transmission, which avoids the disadvantages of the prior art. In particular, production costs should be kept as low as possible. Furthermore, the reversing gearset according to the invention should make sufficient torque available during both forward and reverse driving. A further objective of the invention is to indicate a method for starting in reverse, in particular for a continuously variable belt transmission comprising the reversing gearset according to the invention.

Accordingly, it is proposed to make the reversing gearset as a planetary structure and the planetary gearset as a simple planetary gearset, such that in reverse (i.e. when the rotation direction is reversed) the transmission ratio of the reversing gearset is greater than unity (i.e. there is a speed step-down).

According to a particularly advantageous further development of the invention, the transmission ratio attainable by virtue of the structure of the reversing gearset with a speed step-down when reversing, can be compensated by a corresponding adjustment of the variator, so that from certain speeds the overall transmission ratio of the gearbox when reversing is equal to the overall transmission ratio when driving forward.

Thus, after starting, the overall transmission ratio can be reduced by virtue of the variator ratio, in order to obtain lower engine speeds or higher vehicle speeds after staring.

Thanks to the design according to the invention a reversing gearset is made available, which is of simple structure comprising substantially fewer components than the reversing gearsets known from the prior art and which, while reversing, provides transmission ratios comparable to those for forward driving by using the method according to the invention. Advantageously, the assembly and production costs are reduced without compromising driving comfort.

BRIEF DESCRIPTION OF THE DRAWINGS

The invention is described in greater detail with reference to an example illustrated in the only FIG., which shows a schematic sectional view of a reversing gearset according to the invention.

DETAILED DESCRIPTION OF THE PREFERRED EMBODIMENTS

As shown in the FIG., the reversing gearset 1 comprises a simple planetary gearset with a sun gear 2, a web 3 for the planetary gears 4 and an annular gear 5. In addition a forward clutch 7 is provided, which is engaged when driving forward; to engage reverse gear a brake 8 is provided, by means of which the web 3 of the planetary gearset can be coupled to the housing 9. This puts the sun gear 2 in rotationally fixed connection with the drive input shaft 6 of the reversing gearset 1.

According to the invention the drive output from the reversing gearset takes place via the annular gear 5, which is in rotationally fixed connection with the primary shaft 10. In the context of the embodiment illustrated, the annular gear 5 is connected to the primary shaft 10 via the outer disk carrier 11 of the forward clutch 7, which is preferably welded to the primary shaft 10. The inner disk carrier 12 of the forward clutch 7 is in rotationally fixed connection with the sun gear 2, so that engagement of the forward clutch 7 connects the drive input shaft 6 to the primary shaft 10 without a rotation direction reversal. Thus, during forward driving, i.e. when the forward clutch 7 is engaged and the brake 8 is disengaged, the planetary gearset is blocked and provides no transmission of torque (transmission ratio 1:1).

For driving in reverse the forward clutch 7 is disengaged and the brake 8 is engaged, whereby the web 3 of the planetary gearset is placed in rotationally fixed connection with the housing 9. In the embodiment shown, the outer disk carrier of the brake 8 is integrated in the housing 9; the inner disk carrier 13 is connected to the web 3.

When the brake 8 is engaged, then in accordance with the transmission ratio the annular gear 5 rotates at a lower speed and in the opposite direction as compared with the drive input shaft 6, whereby the torque transmitted by the primary shaft 10 is increased. An example value for the transmission ratio while in reverse is 1.72. According to the invention, by adjustment of the variator transmission ratio an additional continuous variation of the speed or torque corresponding to the variator transmission ratio set is enabled.

To start off in the forward and reverse directions, the highest transmission ratio is set in the variator. Then—as soon as the vehicle is moving—according to the invention a corresponding adjustment of the variator or reduction of the variator transmission ratio can compensate the ratio attained in reverse at slow speed, so that from certain speeds the overall transmission ratio of the gearbox in reverse gear equals the overall transmission ratio during forward driving.

More preferably, the planetary gearset of the reversing gearset 1 comprizes three planetary gears, but depending on other design particulars, the number of planetary gears can be larger. In the example embodiment illustrated, the brake 8 and the forward clutch 7, viewed axially, are arranged approximately next to one another; viewed radially, the brake 8 is arranged essentially outside the annular gear 5.

Obviously, any design feature and in particular any spatial arrangement of the elements of the planetary gearset and the shift elements, in themselves and relative to one another, so far as is technically appropriate, is covered by the protective scope of the present claims without affecting the function of the reversing gearset as indicated in the claims, even if such features are not explicitly represented in the figure or in the description.

INDEXES

1 Reversing gearset
2 Sun gear
3 Web
4 Planetary gears
5 Annular gear
6 Drive input shaft
7 Forward clutch
8 Brake
9 Housing
10 Primary shaft
11 Outer disk carrier of the forward clutch
12 Inner disk carrier of the forward clutch
13 Inner disk carrier of the brake

The invention claimed is:

1. A method of starting in reverse drive in a vehicle having a continuously variable transmission and a reversing gearset such that an overall transmission ratio in the reverse drive is substantially equal to an overall transmission ratio in forward drive, the continuously variable transmission having a variator and the reversing gearset comprising a drive input shaft (6), a primary shaft (10), first and second shift elements (7, 8), for shifting between the forward drive and the reverse drive, and a planetary gearset comprising a sun gear (2), a planet carrier (3) supporting a plurality of planetary gears (4), and a ring gear (5), and the reversing gearset (1) having a forward transmission ratio substantially equal to one, the method comprising the steps of:

setting a highest variator transmission ratio upon starting the vehicle;

compensating for a transmission ratio, which provides a speed-drop in the reverse drive, by a corresponding adjustment of the variator of the continuously variable transmission such that, for certain speeds, the overall transmission ratio in the reverse drive is equal to the overall transmission ratio in the forward drive; and as soon as the vehicle commences movement, reducing the variator transmission ratio to obtain one of a lower engine speed and a higher vehicle speed after starting.

2. The method according to claim 1, further comprising the step of adjusting the variator of the continuously variable transmission such that the overall transmission ratio of the continuously variable transmission and the reversing gearset, for reverse drive, is equal to the overall transmission ratio of the continuously variable transmission and the reversing gearset in the forward drive.

3. A method of starting in reverse drive in a vehicle consisting solely of a continuously variable transmission and a reversing gearset such that only two power flow paths are provided and an overall transmission ratio in the reverse drive is substantially equal to an overall transmission ratio in forward drive, the continuously variable transmission having a variator and the reversing gearset comprising a drive input shaft (6), a primary shaft (10), first and second shift elements (7, 8), for shifting between the forward drive and the reverse drive, and a planetary gearset comprising a sun gear (2), a planet carrier (3) supporting a plurality of planetary gears (4), and a ring gear (5), and the reversing gearset (1) having a forward transmission ratio substantially equal to one, the method comprising the steps of:

setting a highest variator transmission ratio upon starting the vehicle;

compensating for a transmission ratio, which provides a speed-drop in the reverse drive, by a corresponding adjustment of the variator of the continuously variable transmission such that, for certain speeds, the overall transmission ratio in the reverse drive is equal to the overall transmission ratio in the forward drive; and as soon as the vehicle commences movement, reducing the variator transmission ratio to obtain one of a lower engine speed and a higher vehicle speed after starting.

4. A method of starting in reverse drive in a vehicle having a continuously variable transmission and a reversing gearset such that an overall transmission ratio In the reverse drive is substantially equal to an overall transmission ratio in forward drive, the continuously variable transmission having a variator and the reversing gearset comprising a drive input shaft (6), a primary shaft (10), first and second shift elements (7, 8), for shifting between the forward drive and the reverse drive, and a planetary gearset comprising a sun gear (2), a planet carrier (3) supporting a plurality of planetary gears (4), and a ring gear (6), and the reversing gearset (1) having a forward transmission ratio substantially equal to one, the method comprising the steps of setting the continuously variable transmission to achieve a highest possible continuously variable transmission ratio by adjusting the variator;

disengaging the first shift element (7) and engaging the second shift element (8) to slow and reverse rotation of the ring gear (5) in relation to the drive input shaft (6); and when the vehicle begins moving, readjusting the variator such that the reversing gearset (1) has a reverse transmission ratio equal to one and the overall transmission ratio in the reverse drive is essentially the same as the overall transmission ratio in the forward drive.

5. The method according to claim 4, further comprising the step of gearing the reversing gearset (1) such that the reverse transmission ratio of the reversing gearset (1) is greater than one.

6. The method according to claim 4, further comprising the step of controlling the overall transmission ratio, while in the reverse drive, by solely regulating at least one of the continuously variable transmission ratio and the reverse transmission ratio of the reverse gearset (1).

7. The method according to claim 4, further comprising the step of reducing the continuously variable transmission ratio when the vehicle starts moving by readjusting the variator.

* * * * *